United States Patent [19]

Canini et al.

[11] Patent Number: 4,755,349
[45] Date of Patent: Jul. 5, 1988

[54] MECHANISM FOR ANTI-SEISMIC CONNECTION BETWEEN THE PUMP BASE AND THE DOME OF A NUCLEAR POWER STATION

[75] Inventors: Jean-Marc Canini, Cousolre; Serge Watre, Jeumont, both of France

[73] Assignee: Jeumont-Schneider Corporation, Puteaux, France

[21] Appl. No.: 927,816

[22] Filed: Nov. 6, 1986

[30] Foreign Application Priority Data

Dec. 3, 1985 [FR] France ............................. 85 17844

[51] Int. Cl.[4] .............................................. G21C 9/00
[52] U.S. Cl. ..................................... 376/285; 376/402
[58] Field of Search ............... 376/203, 285, 404, 405, 376/402

[56] References Cited

U.S. PATENT DOCUMENTS

| | | | |
|---|---|---|---|
| 4,258,937 | 3/1981 | Barneoud et al. | 285/61 |
| 4,505,872 | 3/1985 | Delloye | 376/285 |
| 4,583,584 | 4/1986 | Wepfer | 376/285 |
| 4,596,689 | 6/1986 | Gorholt et al. | 376/285 |
| 4,634,569 | 1/1987 | Delloye et al. | 376/404 |

FOREIGN PATENT DOCUMENTS

| | | | |
|---|---|---|---|
| 0094326 | 11/1983 | European Pat. Off. | 376/285 |
| 2940469 | 4/1980 | Fed. Rep. of Germany | 376/285 |
| 2300253 | 9/1976 | France . | |
| 2624687 | 10/1983 | France . | |
| 0151092 | 8/1984 | Japan | 376/285 |
| 0164979 | 9/1984 | Japan | 376/285 |
| 0171895 | 9/1984 | Japan | 376/285 |
| 2077025 | 12/1981 | United Kingdom . | |

Primary Examiner—Deborah L. Kyle
Assistant Examiner—Richard W. Wenotland
Attorney, Agent, or Firm—Rines and Rines Shapiro and Shapiro

[57] ABSTRACT

A mechanism for anti-seismic connection between the pump base and the dome of a nuclear power station is characterized by the fact that the pump base (1) is equipped externally with a flange (3) seated with a slight axial play and significant radial play within a socket (4) which is a fixed cover closed by and able to slide axially with a slight play within a cylindrical reinforcement (7a) of the dome (7). A radial damping mechanism (8) is installed between the flange (3) and the socket (4) to permit slow displacements between these two entities, but to block abrupt displacements. The lower end of the socket (4) comprises a collar (15) equipped with a metallic journal (16) which can slide axially within a bearing (17) firm with the internal wall of the dome (7).

20 Claims, 2 Drawing Sheets

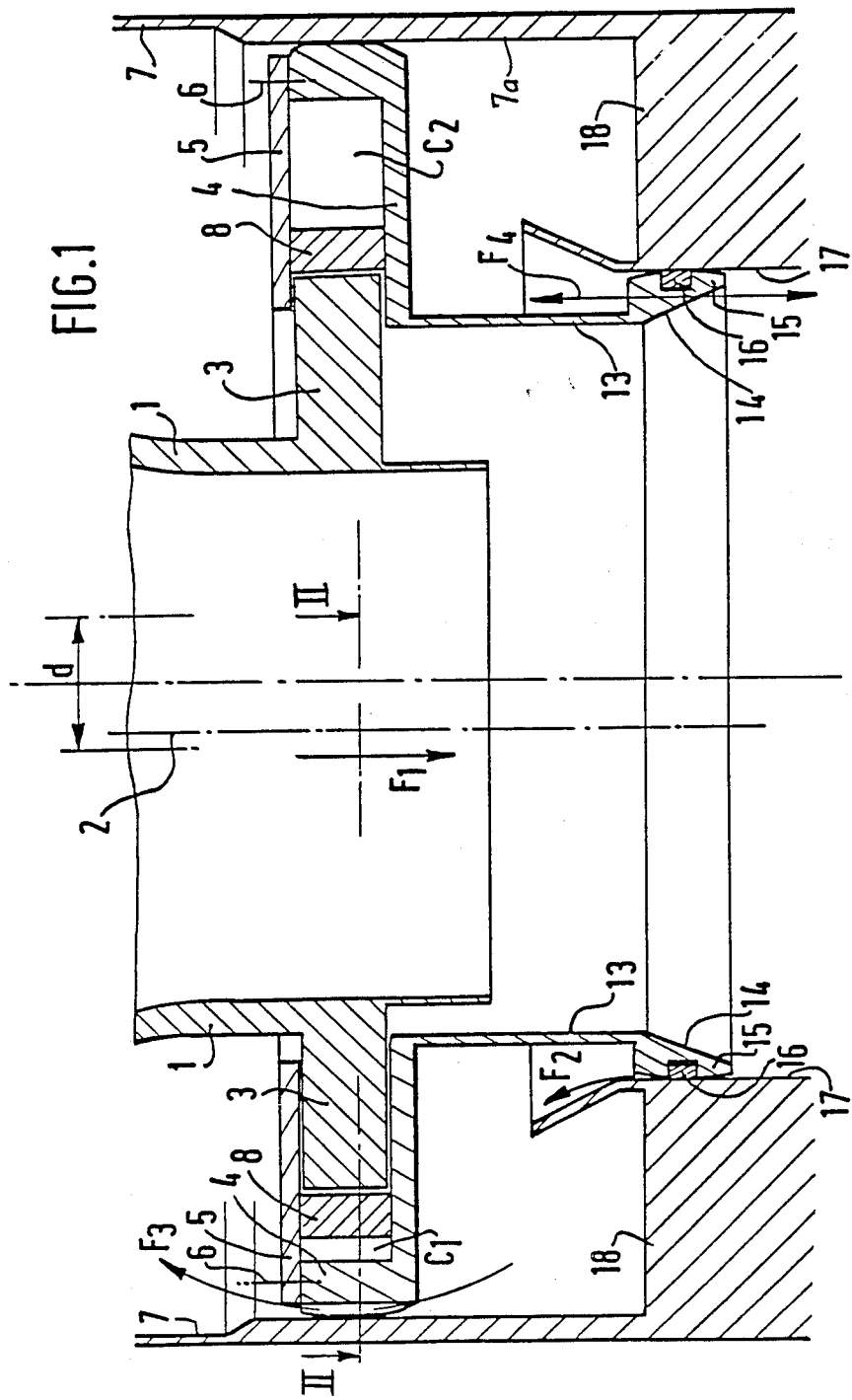

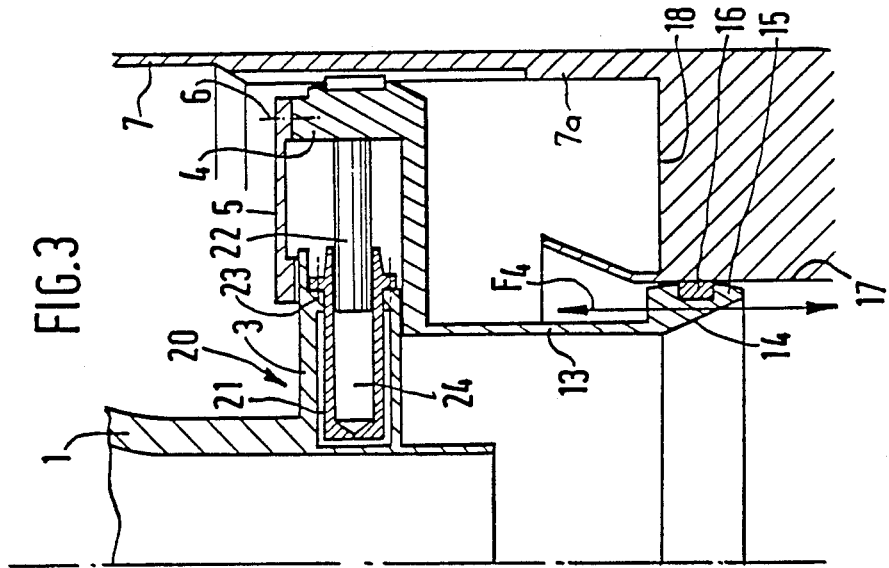
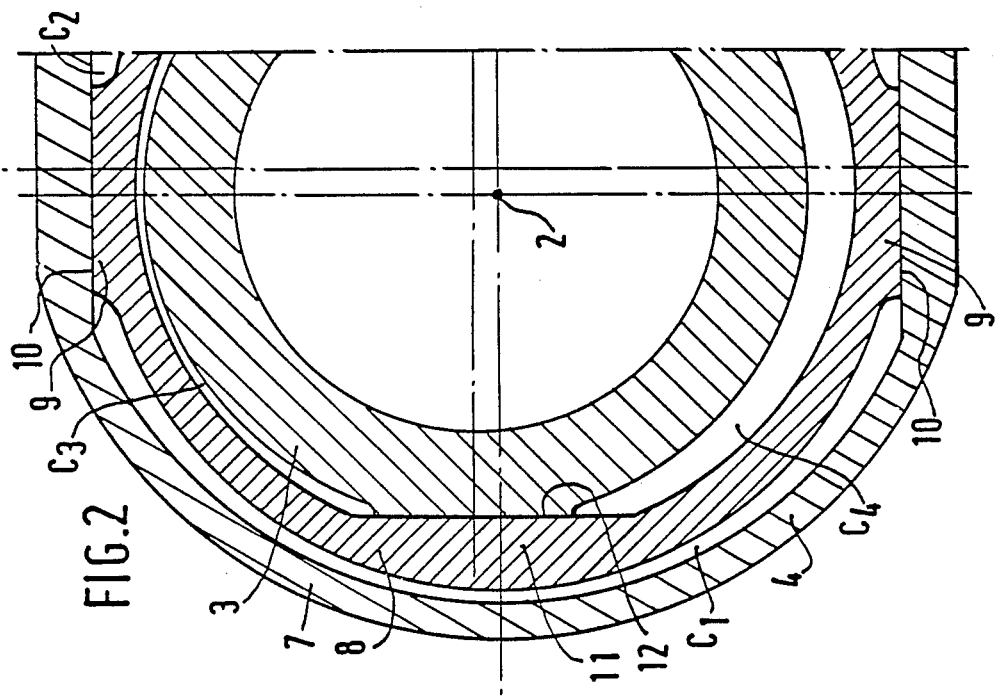

MECHANISM FOR ANTI-SEISMIC CONNECTION BETWEEN THE PUMP BASE AND THE DOME OF A NUCLEAR POWER STATION

The present invention concerns an anti-seismic damping mechanism for the encased primary pumps of nuclear reactors, and, more particularly, such a mechanism intended to limit the pendulum effect of the pump in the case of a seismic disturbance.

It is known that in nuclear reactors equipped with so-called "encased" pumps of great height, it is necessary, in the event of earthquakes, to immobilize the lower part of the pumps relative to the reactor vessel. If this precaution is not taken, the pumps could suffer significant damage from harmful effects due to flexing of the pump body, damage occurring at the area of attachment of the pump to the foundation slab, or other damage.

The immobilization mechanisms provided must react instantaneously and without external intervention to interdict any significant displacement of the base of the pump. These mechanisms, moreover, must permit relative displacements of the pump and the reactor bed to accommodate differential horizontal and vertical thermal expansion between the vessel and the slab during increases in the reactor temperature.

In current breeder reactors, the primary pumps are seated on the slab through the intermediary of an elastic ring or sliding mechanism, which systems allow slow movements during differential thermal expansion between the slab and the vessel. Elastic ring type arrangements allow inclination of the axis of the pump, whereas the sliding mechanism allows variable displacement of the vertical axis of the pump. The connection between this axis and the bed is fixed when the pump is seated on an elastic ring, and an articulated sleeve connecting the pump to the tank is used in the configuration comprising a sliding mechanism.

Differential expansion between the vessel and the slab in the radial or vertical direction is permitted by sliding of the base of the pump within the connection between the pump and the bed, or by modification of the length of the articulated sleeve.

The object of the invention is to provide an anti-seismic damping mechanism for such encased primary pumps within nuclear reactors, which enables a rigid attachment of the primary pumps directly on the slab and which furnishes a clearly more economical solution than that of familiar systems. Of course, the damper mechanism according to the invention must also permit hydraulic hermeticity, the continuity of the hydraulic seam between the base of the pump and the elastic ring regardless of the axial and/or radial differential expansion due to temperature differences between the slab and the bed, and must also hold the pump steady or fixed to avoid the pendulum effect of the pump in the event of an earthquake.

Summarizing the invention, this goal is achieved by virtue of an improved mechanism for anti-seismic connection between the base of the pump and the so-called "dome" of a nuclear power station (the dome, despite its name, may include cylindrical components). The mechanism is characterized by the fact that the pump base is provided externally with a flange seated with a slight axial play and significant radial play within a socket which is closed by an immovable cover. The flange can slide axially with a small play within a cylindrical portion of the dome. A radial damping mechanism is mounted between the flange and the socket, so as to permit, without constraint, slow displacements of the flange with respect to the socket, and to block such displacements when they are rapid. At the same time, the lower end of the socket has an external collar, which, through the intermediary of a metallic journal, can slide axially upon a cylindrical bearing which is solidly bound with the internal lateral wall of the dome. Calibrated passages arranged in the periphery of the vessel enable controlled circulation of the heat-carrying fluid of the reactor between the base of the pump and the upper part of the space between the pump and the dome.

It will be understood that this mechanism permits slow displacements of the base of the pump with respect to the dome in the horizontal direction by sliding of the flange in its socket and in the vertical direction, by sliding of the socket and the collar of the lower part of the pump base within the dome. In fact, the passages arranged in the journal of the collar and at the periphery of the socket have the effect that the fluid bathing the assembly offers practically zero resistance to very slow axial or vertical displacements, such as those resulting from differential thermal expansions. The same applies in the horizontal direction, since, as stated above, the damper mechanism mounted between the flange and its socket permits, without constraint, relative displacements between these two entities, so long as the displacements are very slow.

In an advantageous embodiment of the present invention, the radial damping mechanism specified above is constituted by a damper ring surrounding the flange of the pump base, preserving the significant play which must exist, in the radial direction, between this flange and the socket, and, preferably, this ring displays projections spaced at regular angles, for example, four projections separated by 90°, which bear upon corresponding sufaces of the periphery of the flange or on the internal lateral wall of the socket, and which delimit a number of chambers between the ring and the flange and between the ring and the wall of the socket.

In the case in which the ring displays four projections 90° from one another, and in which the projections are arranged alternately on the interior and the exterior of the ring, there are obtained two pairs of diametrically opposite chambers, one interior and one exterior. Preferably, the projections in question terminate in a flat end which bears against a corresponding plane surface of the wall of the socket or the flange.

In another embodiment of the invention, the radial damper mechanism specified above is constituted by a number of fluid-escape dampers, for example four in number, angularly spaced in a regular manner, with one end of each bearing upon the internal lateral wall of the socket, and the other end upon the periphery of the flange.

It will be understood that the possibility of slow horizontal displacements, for example due to differential thermal expansions, is ensured in the first case by escape of fluid among the various chambers of the damper ring, and, in the second case, by escape passages provided in conventional fashion in the fluid-escape dampers known colloquially as "dashpots." Conversely, rapid displacements, resulting for example from earthquakes, are blocked, through the fact that the fluid cannot move very rapidly through the very narrow calibrated passages specified above. Of course, the same applies for vertical displacements, the fluid being unable to pass very rapidly through the passages provided at the periphery of the socket and within the journal fixed to the collar surrounding the pump base.

The description below, in no way limitational, will facilitate understanding of the way the present invention may be put into practice. It is to be read with reference to the appended drawings, in which:

FIG. 1 shows an axial section of the mechanism according to the invention, in a first embodiment;

FIG. 2 is a partial section along the line II—II of FIG. 1, and

FIG. 3 shows a partial axial section of another embodiment of the damper mechanism according to FIG. 1.

As seen in FIG. 1, the lower part 1 of the pump, not represented in its entirety, is a cylinder of revolution around a vertical axis 2, and, at a certain distance from its lower end, there is an integral peripheral annular flange 3 with rectangular cross section, which is installed in an annular socket 4. Socket 4 is closed at the top by a cover 5, likewise annular, which is held fast by bolts or similar devices, only whose axes 6 have been represented, and which cover surrounds the pump base 1 with a certain play. A damping ring 8 encircles the flange 3, and its external diameter is much smaller than the internal diameter of the socket 4. This arrangement permits horizontal displacements of the flange 3, attached to the pump base, with respect to the socket 4. The socket 4 can slide with a little play within a cylindrical reinforcement 7a of the dome 7. This cylindrical section must be firm with the dome in the horizontal direction. Conversely, in the axial direction, the play between the flange 3 and the socket 4 is very small, so that the two elements are practically solidly fixed to one another in this direction.

The ring 8 (see FIG. 2) has at its outer edge two projections 9, diametrically opposite one another, and each terminated by a flat end 10, which bears against a plane surface projecting from the internal lateral surface of the socket 4. On its interior edge, it has two projections 11, diametrically opposite one another, and at 90° from the projections 9, each terminated by a flat end 12 which bears against a flat section arranged in the external lateral surface of the flange 3. This arrangement delimits between the damper ring 8 and the socket 4 two essentially semi-annular chambers C1 and C2, diametrically opposite one another, and between the ring 8 and the flange 3, two chambers C3 and C4, similar to C1 and C2, but displaced from them by 90°.

Furthermore, the interior edge of the socket 4 is extended downward by a cylindrical skirt 13, flared at the bottom to a truncated cone 14, and terminated at its periphery by an integral collar 15 having an exterior surface formed with an annular groove which receives a metallic journal 16. This journal is pressed against a cylindrical bearing 17, connected to the internal wall of the dome 7 by a horizontal ring 18. Finally, flat grooves with keys, represented in FIG. 2, prevent any rotation of the damping mechanism.

In this installation, the heat-carrying fluid, for example molten sodium, circulates downward in the pump (arrow F1) and can rise between the dome 7 and the pump base 1 through suitably calibrated passages, which can be orifices or grooves, arranged in the journal 16 (arrow F2) and in the periphery of the socket 4 (arrow F3).

The functioning of the above described damping mechanism is as follows: Axial movements of the pump within the dome 7 (arrow F4) are permitted by sliding of the collar 15 within the skirt 17 which is firm with the dome 7 and by sliding of the socket 4 within the internal cylindrical reinforcement of the dome 7.

As regards relative horizontal (radial) movements between the pump and the dome, they are accommodated by sliding of the annular flange 3 within the socket 4, which is firm with the dome in the horizontal direction, with a maximum possible displacement d equal to the difference between the internal diameter of the socket 4 and the external diameter of the damper ring 8. The chambers C1 and C2 permit radial movements along one principal axis, and chambers C3 and C4 permit movement along a second principal axis.

During an earthquake, for example, when abrupt displacements occur in the direction of the first principal axis, as from C1 toward C2, the connection between the pump 1 and the dome 7 compresses the liquid trapped between the dome 7 and the ring 8 due to shifting of the elements acted upon, which in turn causes displacement of the ring 8. The trapped liquid does not have time to escape between these elements to accommodate the displacement (in contrast to what occurs in the case of slow displacements, resulting, for example, from differential thermal expansions). The ring 8, in contact with the pump through the intermediary of the flange 3, thus displaces the pump base 1 in the direction from C1 to C2.

Still in the case of abrupt displacements, this time in the direction from C3 to C4, the ring 8, in mechanical contact with the connection between the pump and the dome, receives the dome's displacment directly. Thereupon, the ring 8 compresses the fluid confined within the chamber which is situated between it and the pump in the direction of displacement, thus communicating its displacement to the pump.

The chambers diametrically opposite those which are compressed, for their part undergo a depressurization, and add their damping force to that of the chambers which are compressed.

In the case of a displacement in an arbitrary direction, for example at 45° with respect to the principal axes, the chambers C1, C2, C3 and C4 act simultaneously.

Finally, in slow movements due to thermal expansions in a horizontal plane (radial movements), the adjustments between the various elements cause sufficient escape of fluid to avoid the effects of compression and decompression of the chambers in question. This circumstance enables displacements without constraint of the pump with respect to the dome. The same holds for vertical (axial) movements, with the flowing fluid being easily able to traverse the passages arranged at the periphery of the socket 4.

In the embodiment represented in FIG. 3, elements identical to those of FIGS. 1 and 2, or playing the same role, have been given the same designations. The damper ring 8 is replaced by several fluid-escape damping mechanisms 20, four in number, for example, commonly known as "dashpots." Dashpots 20 are equidistant from one another and are installed radially between the socket 4 and cavities arranged in the flange 3.

Dashpots are, of course, conventional and will therefore not be described here in detailed fashion. It will suffice to indicate that in the illustrative embodiment of the invention, they each comprise a cylinder 21 lodged within a corresponding cavity of the flange 3, a piston 22, a valve for supply of high pressure to the piston body, with the piston pressed toward the exterior of the cylinder 21 and the free end of the piston bearing against the internal lateral wall of the socket 4, and one or more escape orifices or grooves 23. The cylinder 21 and the piston 22 delimit a chamber 24, which in the present case, is filled with liquid sodium, and opens into the socket 4 which is filled with this fluid.

During abrupt displacements, due, for example, to earthquakes, the connection between the pump and the dome compresses the molten sodium contained within the chambers 24. This fluid cannot rapidly escape through the calibrated orifices or grooves 23 and blocks the pistons 22 from closing the chambers 24. Conversely, in the case of slow displacements resulting from differential thermal expansions in a horizontal plane, the fluid can flow through the orifices or grooves 23, without restraining the displacement between the pump and the dome.

The lower portion of the connection between the pump base 1 and the dome 7 is of the same design as in the previous embodiment.

We claim:

1. In a nuclear reactor having a pump and a dome, an improved anti-seismic connection between a base of the pump and the dome, said connection being characterized in that it includes a socket closed by a fixedly attached cover and axially slidably disposed within a cylindrical portion of said dome, said pump base has an exterior flange received within said socket with relatively large radial play and relatively small axial play, radial damping means is provided between said flange and said socket to freely permit relatively slow radial movements of said flange with respect to said socket due to effects such as differential thermal expansion between elements of the reactor but to block relatively rapid radial displacements of said flange with respect to said socket due to effects such as earthquakes, a lower end of said socket has a collar provided with a metallic journal axially slidable within a cylindrical bearing solidly fixed to an internal lateral wall of said dome, and calibrated passages are arranged at the periphery of said socket to permit controlled circulation of heat-carrying fluid of the reactor between said pump base and said dome.

2. A connection according to claim 1, characterized in that said radial damping means comprises a damper ring surrounding said flange within said socket, said damper ring is movable in a radial direction within said socket, and said flange is movable in a radial direction within said damper ring.

3. A connection according to claim 2, characterized in that said damper ring has angularly spaced projections each bearing on a corresponding surface of the periphery of said flange or an inner peripheral wall of said socket, said projections delimiting damping fluid chambers.

4. A connection according to claim 3, characterized in that each projection has a flat end surface which bears on the said corresponding surface, said corresponding surface also being flat.

5. A connection according to claim 4, characterized in that said projections are alternately disposed interiorly and exteriorly around the circumference of said damper ring.

6. A connection according to claim 5, characterized in that there are four of said projections disposed at 90° angles about the circumference of said damper ring.

7. A connection according to claim 1, characterized in that said radial damping means comprises a plurality of dashpots angularly spaced around said flange, each dashpot having one end acting on said socket and another end acting on said flange.

8. A connection according to claim 7, characterized in that there are four of said dashpots disposed at 90° angles about said flange.

9. A connection according to claim 7, characterized in that said dashpots have respective cylinders at least partially disposed in cavities in said flange.

10. In a nuclear reactor having a pump and a dome, an anti-seismic connection between a base of said pump and said dome having, in combination, an external flange provided upon said pump base seated with relatively small axial play and with relatively large radial play within a socket closed by a fixedly attached cover and capable of sliding axially within a reinforced cylindrical portion of said dome, and radial damping means disposed between said flange and said socket for permitting relatively slow radial displacements between said flange and said socket due to effects such as differential thermal expansion between elements of the reactor and for blocking relatively abrupt radial displacements therebetween due to seismic disturbances, the lower end of said pump base being surrounded by a collar having a journal axially slidable within a bearing solidly fixed to an internal wall of said dome.

11. A connection according to claim 10, characterized in that said radial damping means comprises a damper ring disposed between said flange and said socket, with respective damping fluid chambers being interposed between portions of said ring and said socket and between portions of said flange and said ring.

12. A connection according to claim 10, characterized in that said radial damping means includes a plurality of angularly spaced dashpots acting radially upon said flange and said socket.

13. In a nuclear reactor having a pump and a dome, an anti-seismic connection between a base of said pump and said dome, said connection comprising socket means axially slidable within a portion of said dome, an external flange of said pump base received within said socket means axially movable with said socket means within said portion of said dome and radially movable within said socket means, radial fluid damping means between said flange and said socket means for permitting substantially unconstrained relatively slow radial movements of said flange within said socket means due to effects such as differential thermal expanision between elements of said reactor and for blocking relatively rapid radial movements of said flange within said socket means due to seismic disturbances, and axial fluid damping means including fluid passages formed in said socket means for permitting substantially unconstrained relatively slow axial movements of said socket means within said portion of said dome due to said effects such as differential thermal expansion and for blocking relatively rapid axial movements of said socket means within said portion of said dome due to said seismic disturbances.

14. A connection according to claim 13, characterized in that said socket means includes a circumferential collar surrounding said pump base and axially slidable within a circumferential bearing surface solidly fixed to said dome.

15. A connection according to claim 14, characterized in that said collar has a peripheral journal slidably disposed against said bearing surface.

16. A connection according to claim 15, characterized in that said fluid passages include passages formed in said journal and in an outer peripheral portion of said socket means in which said flange is received.

17. A connection according to claim 13, characterized in that said radial damping means includes a damper ring surrounding said flange within said socket means, said damper ring is radially movable within said socket means, and said flange is radially movable within said damper ring.

18. A connection according to claim 17, characterized in that said damper ring has diametrically opposed external first projection means slidably engaging diametrically opposite internal flats of said socket means, said flange has diametrically opposed external second projection means oriented substantially at 90° to said first projection means and slidably engaging internal peripheral flats of said damper ring, said first projection means delimit diametrically opposed fluid chambers between said damper ring and said socket means, and said second projection means delimit diametrically opposed fluid chambers between said damper ring and said flange.

19. A connection according to claim 18, characterized in that said first and second projection means have flat surfaces slidably engaging the corresponding flats of said socket means and said damper ring.

20. A connection according to claim 13, characterized in that said radial damping means includes a plurality of dashpots acting radially upon said flange and said socket means.

* * * * *